(12) United States Patent
Huang et al.

(10) Patent No.: US 12,111,242 B2
(45) Date of Patent: Oct. 8, 2024

(54) ONE-DIMENSIONAL SOIL COLUMN TEST APPARATUS FOR SEEPAGE AND INTERNAL EROSION IN GEOTECHNICAL CENTRIFUGE

(71) Applicant: ZHEJIANG UNIVERSITY, Zhejiang (CN)

(72) Inventors: Bo Huang, Hangzhou (CN); Chang Guo, Hangzhou (CN); Wenyue Zhang, Hangzhou (CN); Linfeng Cao, Hangzhou (CN); Yao Tang, Hangzhou (CN); Yu Zhao, Hangzhou (CN); Daosheng Ling, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 391 days.

(21) Appl. No.: 17/739,076

(22) Filed: May 7, 2022

(65) Prior Publication Data

US 2022/0260475 A1    Aug. 18, 2022

Related U.S. Application Data

(63) Continuation of application No. PCT/CN2019/115924, filed on Nov. 6, 2019.

(51) Int. Cl.
*G01N 15/08* (2006.01)

(52) U.S. Cl.
CPC ....... *G01N 15/082* (2013.01); *G01N 15/0806* (2013.01); *G01N 15/0826* (2013.01)

(58) Field of Classification Search
CPC ............ G01N 15/082; G01N 15/0806; G01N 15/0826
See application file for complete search history.

(56) References Cited

FOREIGN PATENT DOCUMENTS

| CN | 104458535 A | 3/2015 |
|---|---|---|
| CN | 104535470 A | 4/2015 |
| CN | 104914029 A | 9/2015 |
| CN | 106018242 A | 10/2016 |
| CN | 110987750 A | 4/2020 |
| JP | 2013228384 A | 11/2013 |
| WO | 2016160974 A1 | 10/2016 |

OTHER PUBLICATIONS

International Search Report (PCT/CN2019/115924); Date of Mailing: Aug. 13, 2020.

*Primary Examiner* — Jonathan M Dunlap
(74) *Attorney, Agent, or Firm* — W&G Law Group

(57) ABSTRACT

Disclosed is a seepage and internal erosion test apparatus for geotechnical centrifuges. The apparatus includes a mounting base, a four-motorized-jack synchronized lifting table fixed onto the mounting base, a downstream water sink, a plurality of permeameters, a centrifugal pump, and an upstream water sink fixedly mounted on the four-motorized-jack synchronized lifting table; the downstream water sink, the plurality of permeameters, the centrifugal pump, and the upstream water sink are connected by means of pipes; electric ball valves are separately disposed on each branch on which the permeameter is mounted; a temperature control module and flow meters are disposed of in the pipe for connecting the upstream outlet to the permeameter water inlet.

4 Claims, 3 Drawing Sheets

ONE-DIMENSIONAL SOIL COLUMN TEST APPARATUS FOR SEEPAGE AND INTERNAL EROSION IN GEOTECHNICAL CENTRIFUGE

CROSS-REFERENCE TO RELATED APPLICATIONS

The present application is a continuation of International Application No. PCT/CN2019/115924, filed on Nov. 6, 2019, the content of which is incorporated herein by reference in its entirety.

TECHNICAL FIELD

The present disclosure belongs to the field of geotechnical engineering modeling tests and particularly relates to an apparatus used for realizing a seepage and internal erosion test in geotechnical centrifuges.

BACKGROUND

There are many more-than-100-meter-height dams worldwide, the stability of which is caused by internal erosion is related to the safety of people's lives and property. The geotechnical centrifuge, which can provide a high acceleration environment for the scale model and thus ensure the similarity of stress conditions with the prototype, is an effective means to reproduce the behaviors of high dams in the laboratory.

However, the previous centrifuge modeling test results on internal erosion usually deviate significantly from the prediction of existing theories. There is not enough research on the hypergravity effect of seepage and seepage-caused internal erosion. Therefore, it is necessary to conduct an experimental study on the hypergravity effect of seepage and internal erosion in the environment of the geotechnical centrifuge.

One-dimensional soil column test by permeameter is a classical method to study seepage and internal erosion, but it is seldom used in the centrifuge. The reasons are as follows: (1) A lot of water is needed during the process, and it is challenging to supply and drain water in the centrifuge basket environment; (2) It is needed to change different water levels and ensure the continued stability at the same level; (3) The space of centrifuge basket is limited, and the optional axial pressure loading system of constant gravity needs to occupy a lot of space; (4) It is difficult to carry out multiple groups of tests with a single start-up of the centrifuge and thus caused high test cost; (5) The temperature in the centrifuge room usually rise continuously during the test, and thus the viscosity of the fluid would be affected by the temperature, which makes the test conclusion deviate significantly.

SUMMARY

The technical problem to be solved by the present disclosure is to overcome the shortcomings in the prior art and provide a one-dimensional soil column seepage and internal erosion test apparatus for geotechnical centrifuges.

To solve the technical problem, the solution of the present disclosure is as below:

Provided is a seepage and internal erosion test apparatus for geotechnical centrifuges, including a mounting base, a four-motorized-jack synchronized lifting table fixed on the mounting base, a downstream water sink, a plurality of permeameters, a centrifugal pump, and an upstream water sink fixedly mounted on the lifting table;

the upstream water sink includes an upstream pressure stabilizing bowl and an upstream overflow bowl separated by a partition board; an upstream inlet and an upstream outlet are respectively arranged at the upper portion and the lower portion of a sidewall of the upstream pressure stabilizing bowl; an upstream overflow port is set at the lower portion of a sidewall of the upstream overflow bowl;

the downstream water sink includes a downstream pressure stabilizing bowl and a downstream overflow bowl separated by a partition board, a downstream inlet is arranged at the lower portion of a sidewall of the downstream pressure stabilizing bowl, a downstream pumping port and a downstream overflow port are arranged at the lower portion of a sidewall of the downstream overflow bowl, and the downstream overflow port is higher than the downstream pumping port;

the permeameter includes a barrel, a top cap, a base pedestal, a weight table, a piston bar, an upper perforated plate with metal net and a lower perforated plate; the weight table includes a disc-shaped supporting plate, a weight bar penetrating and vertically fixed in the center of the disc-shaped supporting plate, and weights with a central hole, while the weights can be sleeved on the weight bar; the top cap is fixed on the upper part of the barrel, the center of the top cap is provided with a through-hole, and the piston bar passes through the through-hole; the top end of the piston bar is connected with the bottom end of the weight bar, and the bottom end of the piston bar is fixedly connected with the center of the upper perforated plate; the upper perforated plate is located in the barrel, and the diameter of the upper perforated plate is matched with the inner diameter of the barrel; a sidewall of the top cap is provided with a L-shaped channel as the permeameter outlet; the base pedestal is fixed at the lower part of the barrel, the upper surface of the base pedestal is funnel-shaped, and a metal mesh and the lower perforated plate are sequentially arranged at the opening of the funnel, the diameters of the metal mesh and the lower perforated plate are matched with the inner diameter of the barrel, and the metal mesh is positioned above the lower perforated plate; a sidewall of the base pedestal is provided with a horizontal channel as the permeameter inlet; a plurality of pressure taps are arranged at intervals vertically on a sidewall of the barrel, and pore pressure gauges are installed in the pressure taps;

the downstream water sink, the plurality of permeameters, the centrifugal pump, and the upstream water sink are connected by pipes: the centrifugal pump water outlet is connected to the upstream inlet, the upstream outlet is connected to the permeameter inlet, and the permeameter outlet is connected to the downstream inlet; the downstream pumping port is connected to the centrifugal pump inlet, and the upstream overflow port is connected to the downstream overflow port; the plurality of permeameters are connected in parallel, and each branch on which the permeameters are installed is respectively provided with an electric ball valve; a temperature control module and flow meters are arranged in the pipe where the upstream outlet is connected to the permeameter inlet.

Further, the barrel is made of plexiglass.

Further, sealing rubber 'O' rings are arranged between the barrel and the top cap, between the barrel and the base pedestal, and between the piston bar and the vertical through-hole of the top cap.

Further, the bottom of the top cap and the top of the base pedestal are provided with grooves matched with the barrel, and the barrel is clamped into the grooves, and the top cap and the base pedestal are fixedly connected with the barrel clamped into the grooves through threaded bars and nuts.

Further, the temperature control module includes a heat exchanger and heat exchanger adapters connected to both ends of the heat exchanger. A pipe wall of the heat exchanger is provided with thermoelectric coolers and heat exchange fins.

Compared with the prior art, the present disclosure has the following advantages:

1. in the present disclosure, a centrifugal pump is used to solve the problem of water supply and drainage and achieve circulation in the geotechnical centrifuge environment;
2. by arranging a four-motorized-jack synchronized lifting table and 2-bowl water sinks, the present disclosure realizes the water level lifting and stabilizing in the geotechnical centrifuge environment;
3. the present disclosure utilizes the weight gain effect of hypergravity, and realizes the soil specimens' axial pressure loading in the geotechnical centrifuge environment by using weights and a piston bar;
4. By controlling electric ball valves, the present disclosure solves the problem that the centrifuge can only be tested for one specimen within a single start;
5. The heat exchanger effectively solves the problem of water temperature control.

The apparatus of the present disclosure realizes the experimental research on the hypergravity effect of seepage and internal erosion in the environment of geotechnical centrifuges.

Figure 1:
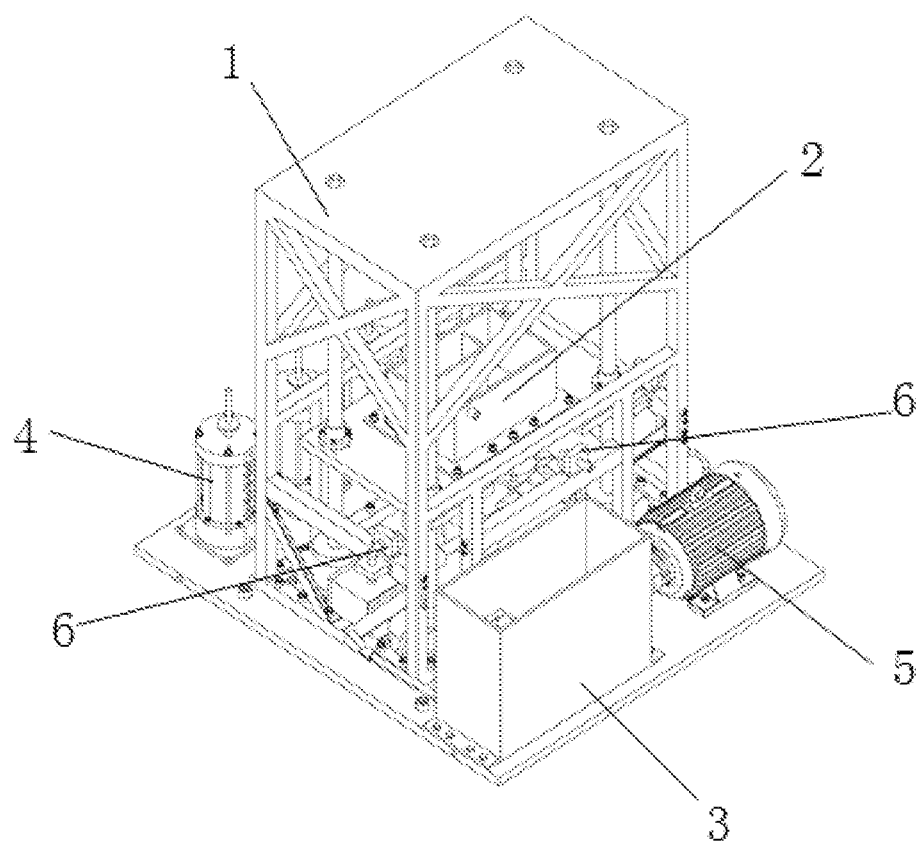
FIG. 1 is an isometric view of the whole apparatus.
Figure 2:
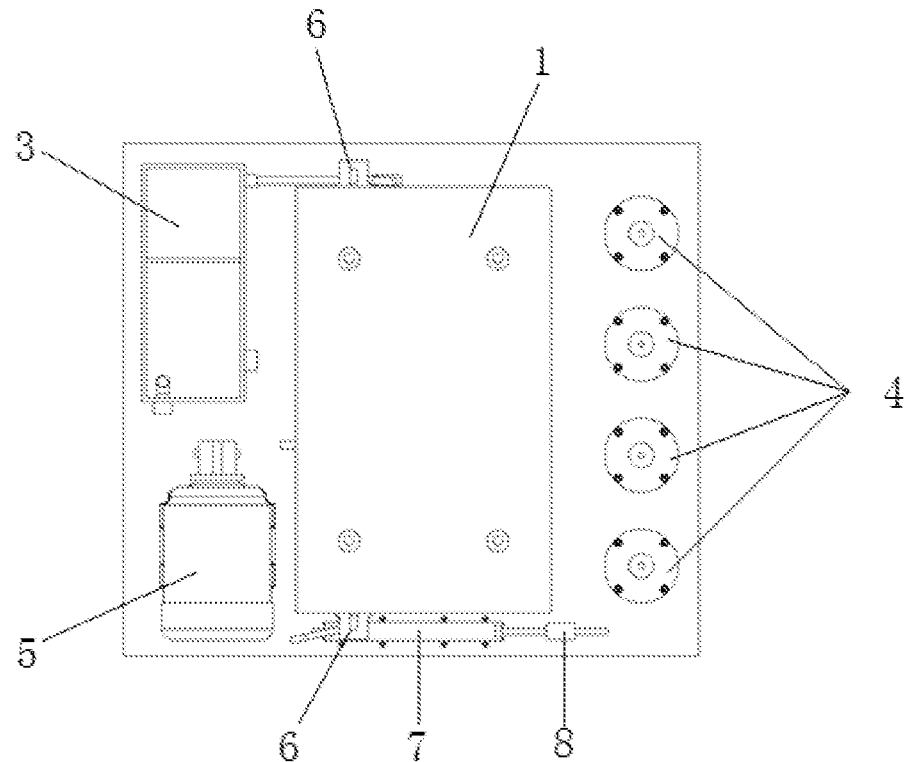
FIG. 2 is a top view of the whole apparatus.
Figure 3:
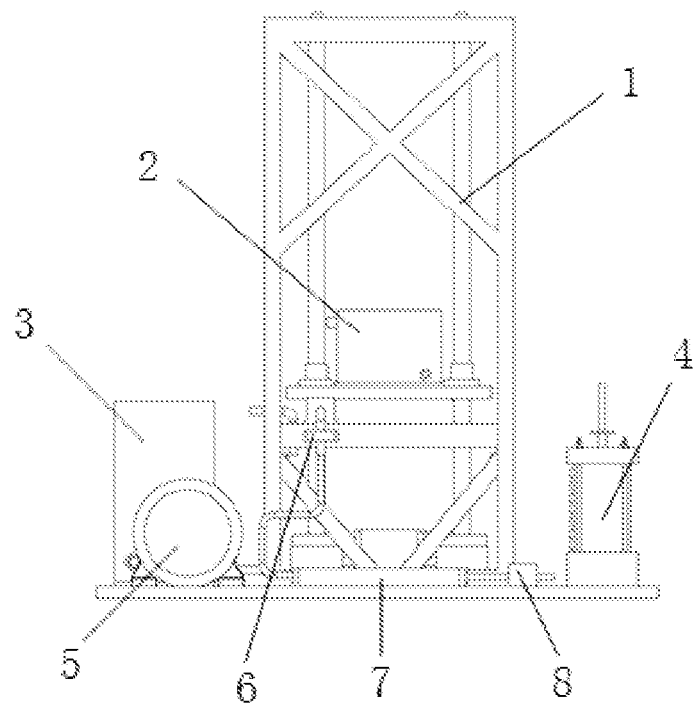
FIG. 3 is a front view of the whole apparatus.

Pipes are not indicated in FIGS. 1-3. The lifting table is not shown in FIG. 4, the arrow indicates the direction of water flow, and the double horizontal bar line indicates the elevation of the water level.

The reference numbers in the figures are below: 1. Four-motorized-jack synchronized lifting table; 2 Upstream water sink; 3 Downstream water sink; 4. Permeameter; 5 Centrifugal pump; 6 Pipe adapter; 7 Temperature control module; 8 Flow meter; 9 Heat exchanger adapter; 10 Heat exchanger; 11 Upstream pressure stabilizing bowl; 12 Upstream overflow bowl; 13 Downstream pressure stabilizing bowl; 14 Downstream overflow bowl; 15 Upstream inlet; 16 Upstream outlet; 17 Upstream overflow port; 18 Downstream inlet; 19 Downstream pumping port; 20 Downstream overflow port; 21 Centrifugal pump inlet; 22 Centrifugal pump outlet; 23 Weight bar; 24 Weight; 25 piston bar; 26 Threaded bar; 27 Top cap; 28 Base Pedestal; 29 Permeameter inlet; 30 Permeameter outlet; 31 Rubber 'O' ring; 32 Upper perforated plate; 33 Lower perforated plate; 34 Perspex barrel; 35 Pressure tap; 36 Funnel-shaped opening.

DESCRIPTION OF EMBODIMENTS

The present disclosure will be further described in detail with reference to the drawings and detailed description.

Figure 6:
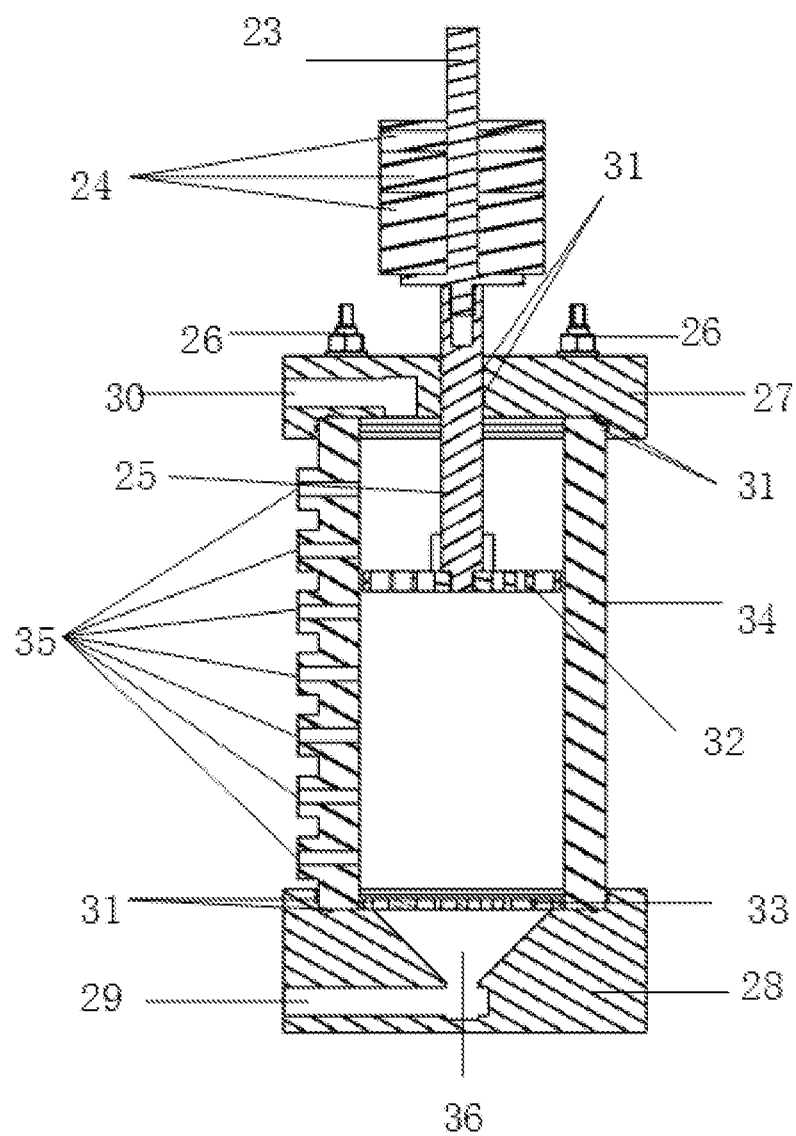
FIG. 6 is a sectional view of the permeameter.

The one-dimensional soil column seepage and internal erosion test apparatus for geotechnical centrifuges provided by the present disclosure, shown in FIGS. 1-3, includes a mounting base, a four-motorized-jack synchronized lifting table 1 fixed on the mounting base, a downstream water sink 3, a plurality of permeameters 4, a centrifugal pump 5, and an upstream water sink 2 fixed on the four-motorized-jack synchronized lifting table 1;

the upstream water sink 2 includes an upstream pressure stabilizing bowl 11 and an upstream overflow bowl 12 separated by a partition board; an upstream inlet 15 and an upstream outlet 16 are respectively arranged at the upper portion and lower portion of the sidewall of the upstream pressure stabilizing bowl 11; an upstream overflow port 17 is set at the lower portion of the sidewall of the upstream overflow bowl 12;

the downstream water sink 3 includes a downstream pressure stabilizing bowl 13 and a downstream overflow bowl 14 separated by a partition board; a downstream inlet 18 is arranged at the lower portion of the sidewall of the downstream pressure stabilizing bowl 13; a downstream pumping port 19 and a downstream overflow port 20 are arranged at the lower portion of the sidewall of the downstream overflow bowl 14, the downstream overflow port 20 being higher than the downstream pumping port 19;

as shown in FIG. 6, the permeameter 4 includes a barrel 34, a top cap 27, a base pedestal 28, a weight table, a piston bar 25, an upper perforated plate 32, a metal mesh and a lower perforated plate 33; the weight table includes a disc-shaped supporting plate, a weight bar 23 penetrating and vertically fixed in the center of the disc-shaped supporting plate, and weights 24 with central hole, while the these weights 24 can be sleeved on the weight bar 23; the top cap 27 is fixed on the upper part of the barrel 34, the center of the top cap 27 is provided with a through-hole, and the piston bar 25 passes through the through-hole; the top end of the piston bar 25 is connected with the bottom end of the weight bar 23, and the bottom end of the piston bar 25 is fixedly connected with the center of the upper perforated plate 32; the upper perforated plate 32 is located in the barrel 34, and the diameter of the upper perforated plate 32 is matched with the inner diameter of the barrel 34, and the upper perforated plate 32 can move up and down in the barrel 34 to facilitate disassembly; the sidewall of the top cap 27 is provided with an L-shaped channel as the permeameter outlet 30; the base pedestal 28 is fixed at the lower part of the barrel 34, and the upper surface of the base pedestal 28 is funnel-shaped; a metal mesh and the lower perforated plate 33 are sequentially arranged at the funnel opening; the metal mesh is positioned above the lower perforated plate 33; the diameters of the metal mesh and the lower perforated plate 33 are matched with the inner diameter of the barrel 34, and the metal mesh and the lower perforated plate 33 can move slightly in the barrel 34, which is convenient for disassembly; in use, the metal mesh and the lower perforated plate 33 are fixed above the funnel opening under the pressure of the upper soil; the sidewall of the base pedestal 28 is provided with a horizontal channel as the permeameter inlet 29; a plurality of pressure taps 35 are arranged at intervals vertically on a sidewall of the barrel 34, and pore pressure gauges are installed in the pressure taps 35; two ends of the piston bar 25, the bottom end of the weight bar 23, and the upper perforated plate 32 can be provided with matching threads; the piston bar 25 passes through the through-hole, and its top end is screwed with the center, and its bottom end is screwed with the center of the upper perforated plate 32, but it is not limited thereto.

Figure 4:
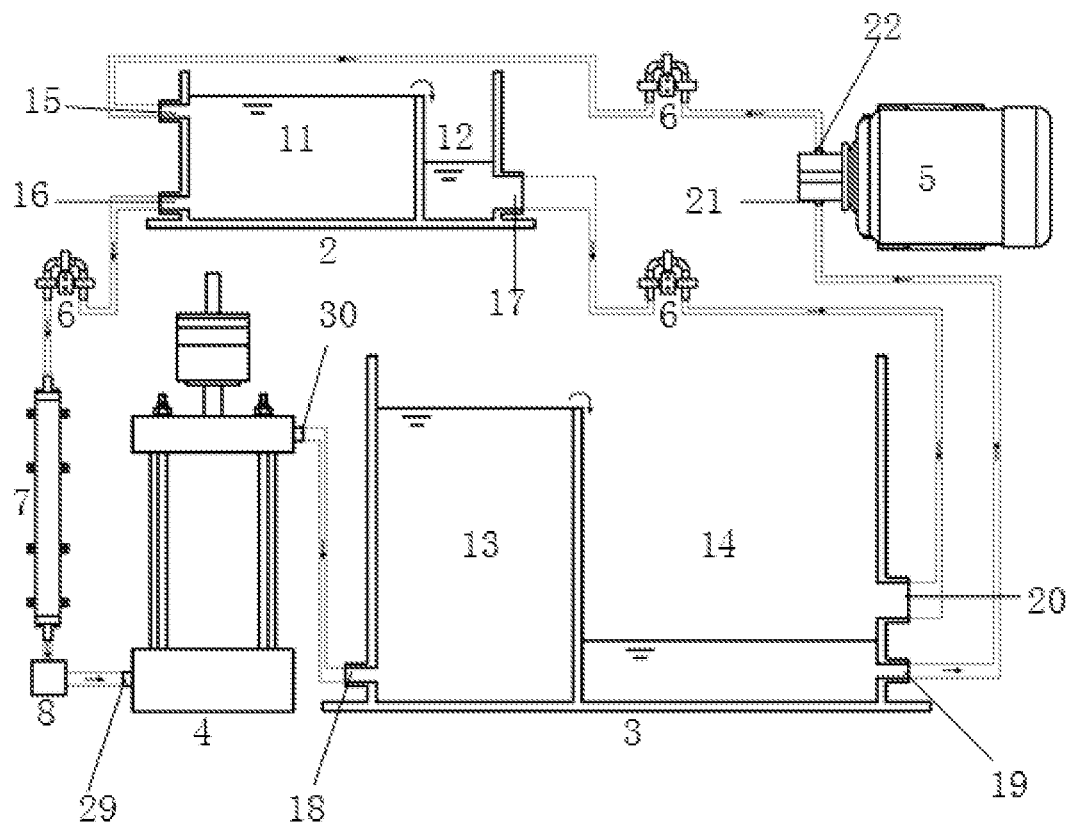
FIG. 4 is a schematic diagram of the overall pipes' connection of the apparatus.

As shown in FIG. 4, the downstream water sink 3, the plurality of permeameters 4, the centrifugal pump 5, and the upstream water sink 2 are connected by pipes: the centrifugal pump outlet 22 is connected to the upstream inlet 15, the upstream outlet 16 is connected to the permeameter inlet 29, the permeameter outlet 30 is connected to the downstream inlet 18, the downstream pumping port 19 is connected to the centrifugal pump inlet 21, and the upstream overflow port 17 is connected to the downstream overflow port 20. The plurality of permeameters 4 are connected in parallel; a temperature control module 7 and flow meters 8 are arranged in the pipe from the upstream outlet 16 to the permeameter inlet 29.

Figure 5:
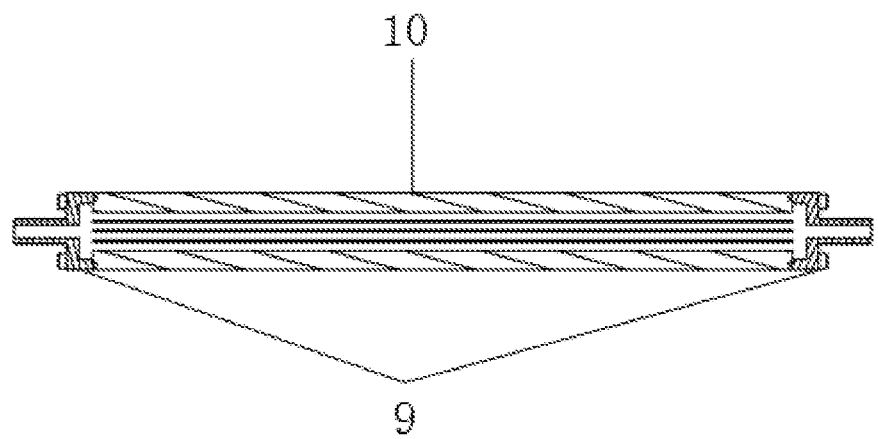
FIG. 5 is a sectional view of the temperature control module.

In addition, as shown in FIG. 5, the temperature control module 7 includes a heat exchanger 10 and heat exchanger adapters 9 connected to both ends of the heat exchanger 10, and the pipe wall of the heat exchanger 10 is provided with thermoelectric coolers and heat exchange fins. The thermoelectric coolers can be TEC-12712-40, but it is not limited thereto.

The flow meter can be the elliptical gear flow meter, but it is not limited thereto.

Specific Embodiments

This embodiment is a quadruple-permeameter test apparatus, and its basic structure is as mentioned above. Four permeameters 4 (as shown in FIG. 2) are installed in parallel through pipes. The four-motorized-jack synchronized lifting table 1 is a mature product used to lift the upstream water sink, including four jacks, two transmission boxes, a reducer, a servo motor, four lifting nuts, a lifting table, and a rack. The upstream water sink 2 provides a stable and variable inlet water pressure, while the downstream water sink 3 provides a stable outlet water pressure. The permeameter 4 is for filling soil specimens for tests. The multistage centrifugal pump is designed to drive circulating water. The temperature control module 7 is for adjusting the temperature. The gear flow meter 8 is set for measuring the fluid flow rate.

As a solution, it also includes pipe adapters 6, which are arranged on the racks of the four-motorized-jack synchronized lifting table 1 to prevent the pipe from bending in the lifting process.

The weights 24 are cylindrical with an opening, matched with the outer diameter of the weight bar 23, in the center. The lower portion of the weight table 23 and the lower side of the piston bar 25 are provided with external threads, while the upper side of the piston bar 25 and the center of the upper perforated plate 32 are provided with internal threads to realize the rigid connection between the weight table. The piston bar 25 and the upper perforated plate 32 transfer the weight of the weights 24 to the perforated plate 32 and then to the soil specimens. Under the hypergravity environment, high axial pressure can reach even when a small amount of weights 24 are added.

The sidewall of barrel 34 is provided with pressure taps 35, and pore pressure gauges are installed inside to measure the water pressure. The top cap 27 and base pedestal 28 are concave-shaped for clamping the barrel. And rubber rings 31 are arranged at the contact between the groove and the barrel to prevent leakage. A through-hole is opened in the center of the top cap 27 for inserting the piston bar 25, and two rubber rings are arranged in the through-hole to prevent leakage. The center of the base pedestal 28 is provided with a funnel-shaped opening 36 for placing glass beads in the test to avoid jet flow. The upper edge of the funnel-shaped opening 36 is equipped with a perforated plate 33 and a metal net to prevent the loss of soil particles. The top cap 27, the base pedestal 28, and the barrel 34 are fastened and fixed by four threaded bars 26.

How to Use the Apparatus:

The whole apparatus is fixed in a geotechnical centrifuge basket.

During the test, the water circulation process is as follows: the centrifugal pump 5 pumps excess water from the downstream inlet 19, and then flows through the centrifugal pump water inlet 21, the centrifugal pump water outlet 22, and the pipe adapter 6 to the upstream inlet 15, and then enters the upstream pressure stabilizing bowl 11; the water in the upstream pressure stabilizing bowl 11 flows from the upstream outlet 16, through the pipe adapter 6, the temperature control module 7 and the gear flow meters 8 in turn, to the permeameter water inlet 29, so as to seep into the soil specimens, then flows into the downstream inlet 18 from the permeameter water outlet 30, then enters the downstream pressure stabilizing bowl 13, and then overflows into the downstream overflow bowl 14; excess water entering the upstream pressure stabilizing bowl 11 overflows into the upstream overflow bowl 12 from the pressure stabilizing bowl 11, and then flows into the downstream overflow port 20 from the upstream overflow port 17 through the pipe adapter 6; preferably, the diameters of the upstream overflow port 17 and downstream overflow port 20 and the connecting water pipes should be large enough to ensure smooth overflow.

When controlling the lifting of the four-motorized-jack synchronized lifting table 1, the elevation of the four-motorized-jack synchronized lifting table 1 can be controlled according to the servo motor equipped with the four-motorized-jack synchronized lifting table 1. In addition, with the temperature control module 7, a thermometer can be set in the water sink. The heat exchanger 10 can be used to control the water flow temperature according to the test requirements and the feedback of the thermometer.

Four permeameters with pipes are connected in parallel. Each branch is provided with an electric ball valve, which can be opened or closed accordingly so that four tests can be carried out at one start. According to the test range requirements, multiple gear flow meters 8 can be connected in parallel. Each gear flow meter is provided with an electric ball valve, which can be opened or closed accordingly.

During the test, the elevation of the upstream water sink 2, the opening and closing of the electric ball valve, and the temperature would be controlled according to the test requirements. The pore water pressure and flow rate would be obtained.

Test Examples

1. Under constant gravity, four permeameters 4 were filled with soil specimens and saturated with water; seven pore pressure gauges (ranging from 0 to ±0.4 MPa) were arranged on the sidewall. Two parallel gear flow meters 8 (with measuring ranges of 1-100 ml/min and 30-3000 ml/min, respectively) were arranged on the pipe between the permeameter water inlet 29 and the upstream outlet 16; electric ball valves (6 in total) controlled four permeameters 4 and two gear flow meters 8 respectively. Enough water was introduced into the upstream and downstream water sinks. The elevation of the upstream water sink was changed to adjust the water levels of the upstream and downstream to the same elevation.

2. The geotechnical centrifuge was started, and the centrifugal acceleration was raised to 30 times the gravity acceleration. The electric ball valves for the first permeameter and the 1-100 ml/min gear flow meter were opened. The upstream water sink was lifted to a specific elevation. Then the upstream water sink was raised again. Until the flow rate reached about 65 ml/min (not more than 100 ml/min and not less than 30 ml/min), the electric ball valve of the 1-100 ml/min gear flow meter was closed, and the electric ball valve for the 30-3000 ml/min gear flow meter was opened. The measurement was carried out as above until the maximum flow rate or pore water pressure required by the experiment was reached. The flow rate of soil specimens under different upstream water levels was measured.

3. The same experiment was conducted as in step 2 to measure the flow rate of the 2nd-4th permeameters under different upstream water levels.

During the experiment, the water temperature was kept at 25±3° C. The signals of the pore pressure gauges and gear flow meters were collected by a data logger provided by the geotechnical centrifuge.

In the above test, four permeameters could be filled with soil specimens with the same or different soil particle size distribution and void ratios, or the tests could be carried out under different accelerations. In the single start-up of the centrifuge, the quadruple-permeameter test apparatus is simple and convenient to operate and is beneficial to reducing the test cost.

In the above test, it is also possible to change the liquid in the upstream and downstream water sinks to study the influence of the liquid viscosity on the seepage and internal erosion test.

The above embodiments are preferred embodiments of the present disclosure, but the embodiments of the present disclosure are not limited by the above embodiments. Any other changes, modifications, substitutions, combinations, and simplifications made without departing from the spirit and principle of the present disclosure should be equivalent replacement methods, which shall be included in the scope of protection of the present disclosure.

What is claimed is:

1. A seepage and internal erosion test apparatus for geotechnical centrifuges, comprising a mounting base, a lifting table fixed on the mounting base, a downstream water sink, a plurality of permeameters, a centrifugal pump, and an upstream water sink fixedly mounted on the lifting table;

wherein the upstream water sink comprises an upstream pressure stabilizing bowl and an upstream overflow bowl separated by a partition board, wherein an upstream inlet and an upstream outlet are respectively arranged at an upper portion and a lower portion of a sidewall of the upstream pressure stabilizing bowl, and an upstream overflow port is set at the lower portion of a sidewall of the upstream overflow bowl;

wherein the downstream water sink comprises a downstream pressure stabilizing bowl and a downstream overflow bowl separated by a partition board, wherein a downstream inlet is arranged at the lower portion of a sidewall of the downstream pressure stabilizing bowl, a downstream pumping port and a downstream overflow port are arranged at the lower portion of a sidewall of the downstream overflow bowl, and the downstream overflow port is higher than the downstream pumping port;

wherein the permeameter comprises a barrel, a top cap, a base pedestal, a weight table, a piston bar, an upper perforated plate, a metal net, and a lower perforated plate;

wherein the weight table comprises a disc-shaped supporting plate, a weight bar penetrating and vertically fixed in a center of the disc-shaped supporting plate, and weights with a central hole, while the weights are sleeved on the weight bar; the top cap is fixed on an upper part of the barrel, a center of the top cap is provided with a through-hole, and the piston bar passes through the through-hole; a top end of the piston bar is connected with a bottom end of the weight bar, and the bottom end of the piston bar is fixedly connected with a center of the upper perforated plate; the upper perforated plate is located in the barrel, and a diameter of the upper perforated plate is matched with an inner diameter of the barrel;

wherein a sidewall of the top cap is provided with a permeameter water outlet; the base pedestal is fixed at a lower part of the barrel, an upper surface of the base pedestal is funnel-shaped, and a metal mesh and the lower perforated plate are sequentially arranged at an opening of a funnel, diameters of the metal mesh and the lower perforated plate are matched with the inner diameter of the barrel, and the metal mesh is positioned above the lower perforated plate;

wherein a sidewall of the base pedestal is provided with a permeameter inlet;

wherein a plurality of pressure taps are arranged at intervals vertically on a sidewall of the barrel, and pore pressure gauges are installed in the pressure taps;

wherein the downstream water sink, the plurality of permeameters, the centrifugal pump and the upstream water sink are connected by pipes:

wherein a centrifugal pump water outlet is connected to the upstream inlet, the upstream outlet is connected to a permeameter water inlet, and the permeameter water outlet is connected to the downstream inlet; the downstream pumping port is connected to a centrifugal pump inlet, and the upstream overflow port is connected to the downstream overflow port;

wherein the plurality of permeameters are connected in parallel, and each branch on which the permeameters are installed is respectively provided with an electric ball valve; a temperature control module and flow meters are arranged in the pipe where the upstream outlet is connected to the permeameter inlet; and wherein the temperature control module comprises a heat exchanger and heat exchanger adapters connected to both ends of the heat exchanger, and a pipe wall of the heat exchanger is provided with thermoelectric coolers and heat exchange fins.

2. The seepage and internal erosion test apparatus according to claim 1, wherein the barrel is made of plexiglass.

3. The seepage and internal erosion test apparatus according to claim 1, wherein sealing rubber rings are arranged between the barrel and the top cap, between the barrel and the base pedestal, and between the piston bar and a vertical through-hole of the top cap.

4. The seepage and internal erosion test apparatus according to claim 1, wherein, the bottom of the top cap and the top of the base pedestal are provided with grooves matched with the barrel, and the barrel is clamped into the grooves, and the top cap and the base pedestal are fixedly connected with the barrel clamped into the grooves through threaded bars and nuts.

* * * * *